(12) United States Patent
Gordon

(10) Patent No.: US 7,784,611 B2
(45) Date of Patent: Aug. 31, 2010

(54) BOOTS, WASH BAG AND OUTER CONTAINER COMBINATION

(76) Inventor: Susan W. Gordon, 11 Sunset Rd., Rhinebeck, NY (US) 12572

( * ) Notice: Subject to any disclaimer, the term of this patent is extended or adjusted under 35 U.S.C. 154(b) by 381 days.

(21) Appl. No.: 11/823,052

(22) Filed: Jun. 27, 2007

(65) Prior Publication Data

US 2008/0235985 A1  Oct. 2, 2008

(51) Int. Cl.
*B65D 85/18* (2006.01)
(52) U.S. Cl. .................... 206/278; 383/89; 383/117; 383/902
(58) Field of Classification Search ............ 206/278; 150/113; 383/88, 89, 90, 91, 117, 902, 6, 383/22, 24, 25, 30
See application file for complete search history.

(56) References Cited

U.S. PATENT DOCUMENTS

| | | | |
|---|---|---|---|
| 2,449,936 A | 9/1948 | Glasgow | |
| 3,402,323 A | 9/1968 | Longstreth | |
| 4,244,453 A | 1/1981 | Herz | |
| 4,949,842 A | 8/1990 | Mokiao, II | |
| 4,967,491 A | 11/1990 | Plotkin | |
| 4,970,821 A * | 11/1990 | Young | 43/54.1 |
| 5,207,254 A * | 5/1993 | Fromm | 150/104 |
| 5,729,915 A | 3/1998 | Khoo et al. | |
| 6,186,201 B1 * | 2/2001 | Salz | 150/105 |
| 6,230,950 B1 | 5/2001 | Heetman | |
| 6,584,704 B2 | 7/2003 | March | |
| 6,669,080 B2 * | 12/2003 | Ong | 229/67.3 |
| 6,715,594 B2 * | 4/2004 | Milionta et al. | 190/110 |
| 6,823,909 B1 * | 11/2004 | Marsteller | 150/113 |
| 6,836,976 B2 | 1/2005 | Haugland | |
| D506,604 S | 6/2005 | Parker et al. | |
| 6,948,599 B2 | 9/2005 | Rodrigue et al. | |
| 7,168,190 B1 | 1/2007 | Gillespie | |
| 2002/0074199 A1 * | 6/2002 | Albritton | 190/107 |
| 2003/0121579 A1 * | 7/2003 | Bockewitz | 150/106 |
| 2005/0045500 A1 | 3/2005 | Mangano et al. | |
| 2007/0181451 A1 * | 8/2007 | Jones | 206/278 |
| 2007/0272570 A1 | 11/2007 | Brooks | |
| 2008/0022555 A1 | 1/2008 | Mor et al. | |

* cited by examiner

*Primary Examiner*—Jacob K Ackun, Jr.
(74) *Attorney, Agent, or Firm*—Joseph L. Spiegel; Heslin Rothenberg Farley & Mesiti P.C.

(57) ABSTRACT

In a boots, wash bag and outer container combination, the boots have a lined interior of thin, waterproof nylon material, and are of a rollable, stretchable, waterproof, washable material, and have a waterproof zipper for slipping the boots on and off. The soles of the boots are honeycombed so they will not collect stones and dirt and add slip resistance. The wash bag is rectangular-shaped and is of rollable, waterproof, washable material, It has an upper zippered opening for receipt and holding a pair of boots, a plurality of outer snaps, and, a loop for hanging the bag. The outer container, also rectangular, is of rollable, waterproof, washable material. The container has an envelope-shaped closing flap for receipt and containment of the boots-containing bag, a strap, depending from the flap with a clip thereon, a strap depending from the container with a mating clip, internal snaps for mating with the bag snaps to hold the bag in place within the container, and, a loop for hanging the container. The boots, boot-containing bag and bag containing container combination is capable of being rolled up and stored in a small space. The straps, when container clips are mated and tightened, maintain the combination in the small space.

2 Claims, 3 Drawing Sheets

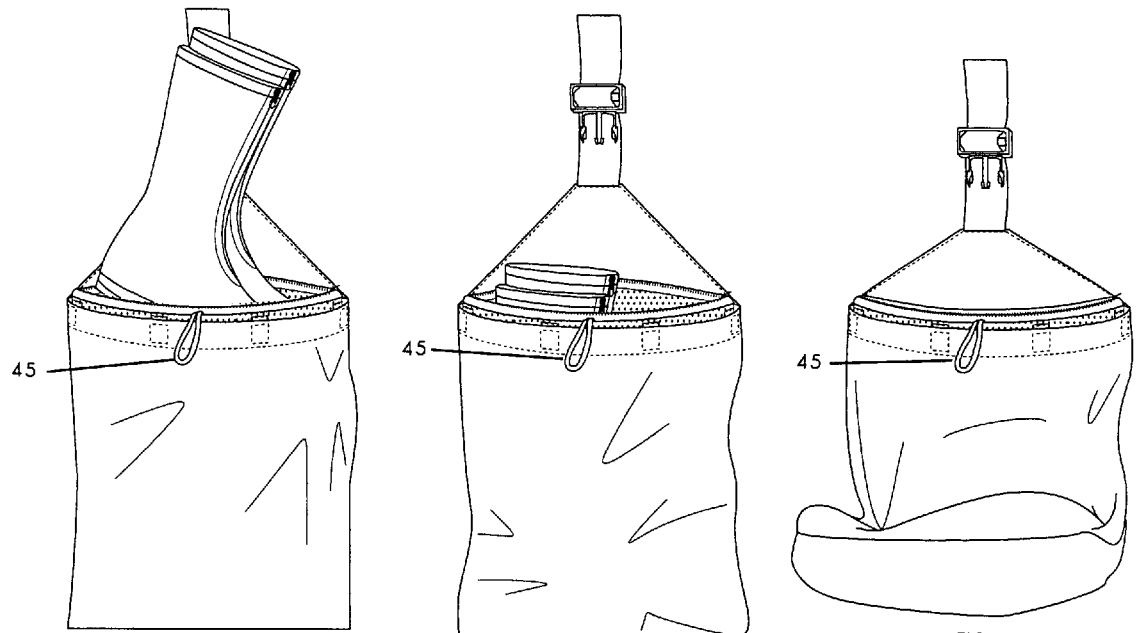
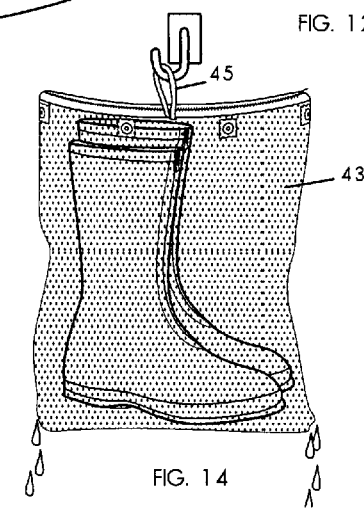
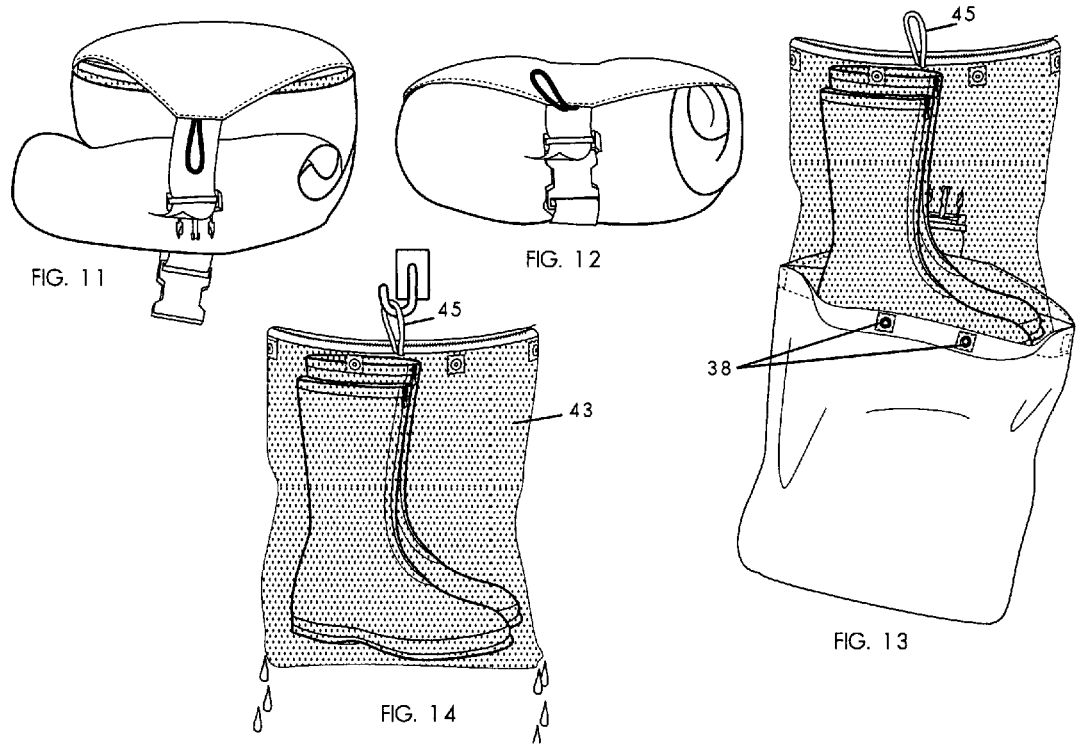
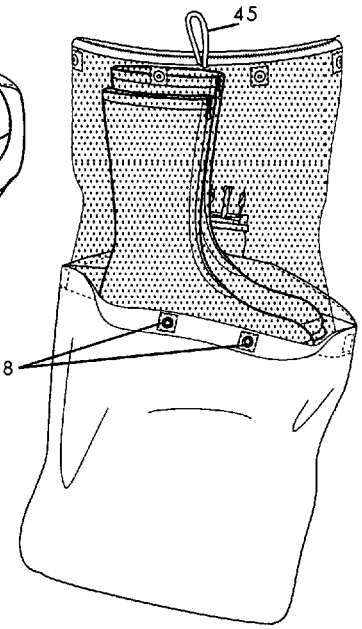

BOOTS, WASH BAG AND OUTER CONTAINER COMBINATION

BACKGROUND OF THE INVENTION

1. Field of the Invention

The present invention relates to a combination that allows a convenient and acceptable method of transporting outerwear. More particularly, the present invention relates to a combination boots or galoshes, wash bag and outer container that can be collapsed and rolled into a small package for convenient use and carrying in a backpack.

2. Description of the Prior Art

Frequently bulky boots, suitable for outdoor use, but exchanged for regular footwear when indoors, are misplaced, left at the wrong location after a previous use or, in general not available at a time or place when needed. In addition, the transporting of outerwear is cumbersome.

Also, a child attending school during bad weather, will wear boots to school carrying his or shoes. Then, when arriving at school, the child changes into the shoes and the boots are then left in the corridors of the school, presenting a hazard to passersby and frequently leading to loss of one or more of the boots.

Glasgow, U.S. Pat. No. 2,449,936, pertains to a foot wrapper, adapted to be worn over a shoe that can be folded and stored or carried in a small place.

Khoo, et al., U.S. Pat. No. 5,729,915, disclose a protective boot for footwear that is readily folded and converts itself into a compact space so as to fit into a small storage space such as a backpack. There is no separate storage for the boots.

March, U.S. Pat. No. 6,584,704 describes a disposable, flexible, substantially waterproof overshoe.

Haugland, U.S. Pat. No. 6,836,976 relates to collapsible footwear, though not an overshoe.

Gillespie, U.S. Pat. No. 7,168,190, is directed to a collapsible athletic shoe.

The prior art is devoid of a solution to the problems to which the present invention is directed.

What the prior art lacks is a convenient combination that includes outer footwear that is easy to wear, already readily stored in a small storage space and washable by the user.

SUMMARY

An object of the invention is a boot containing combination that is rollable for compact storage such as in a backpack.

These and other objects, features and advantages are accomplished in accordance with the teachings of the present invention, one illustrative embodiment of which comprises a boots, wash bag and outer container combination. The boots have a lined interior of thin, waterproof nylon material, are of a rollable, stretchable, waterproof, washable material, and have a waterproof zipper for slipping the boots on and off. The soles of the boots are honeycombed so they will not collect stones and dirt and add slip resistance. The wash bag is rectangular-shaped and is of rollable, waterproof, washable material, It has an upper zippered opening for receipt and holding a pair of boots, a plurality of outer snaps, and, a loop for hanging the bag. The outer container, also rectangular, is of rollable, waterproof, washable material. The container has an envelope-shaped closing flap for receipt and containment of the boots-containing bag, a strap depending from the flap with a clip thereon, a strap depending from the container with a mating clip, internal snaps for mating with the bag snaps to hold the bag in place within the container, and, a loop for hanging the container. The boots, boot-containing bag and bag-containing container combination is capable of being rolled up and stored in a small space. The straps, when container clips are mated, and tightened, maintain the combination in the small space.

BRIEF DESCRIPTION OF THE DRAWING

Other objects, features and advantages of the present invention will be apparent from the following detailed description and accompany drawing, wherein:

FIGS. 8 through 12 are progressive perspective views of boots being placed in the washable bag within the outer container and the combination being rolled up tightly into into a small space;

FIG. 13 is a perspective view of the combination showing the boot-containing washable bag being removed from the outer container, FIG. 14 is a perspective view showing the boot-containing washable bag being hung by its loop from a hook.

DETAILED DESCRIPTION

Figure 1:
FIG. 1 is a perspective view of a pair of boots constructed and for use in accordance with the teachings of the present invention, and with a front positioned zipper.

Referring to the drawing and to FIG. 1 thereof, there is shown a pair of boots or galoshes 11, the boots having the ability to be pulled over shoes or sneakers for wearing in a bad weather situation such as rain or snow. The type shoes envisioned are flat-soled or wedged, but not high heels. The boots 11 are made of a material such as PVC rubber or natural rubber (30 gauge) and is of such a composition and structure that it is waterproof, stretchable, washable and rollable.

Each boot includes an upper 12 arranged to be positioned over the footwear, having a top with an opening for receipt of the leg and footwear of a user and for covering the ankle and lower portion of the leg of a user.

Each boot includes a somewhat thicker sole 13 of a size and configuration substantially conformimg to the bottom of footwear. The bottoms of the soles 14 have a honeycomb design (FIG. 3), so they will not collect stones and dirt and can be marked with an L or R for easy foot differentiation.

The interiors of the boots are lined at 15 (FIG. 1). The lining 15 is a thin sheathing of nylon type material that completely lines the entire interior of the boot and is applied during the construction phase of the boot. The lining 15 assures that the boot will maintain its shape during use, and return to its original shape after having been rolled up or washed. It also prevents the shoe from sticking to the rubber or material of the boot. The entire boot 11 is of the same, flexible material, with the bottom 14 being slip resistant due, in part, to the bottom, honeycomb configuration.

Figure 2:
FIG. 2 is a perspective view of a pair of boots constructed and for use in accordance with the teachings of the present invention, and with zipper positioned on the side.
Figure 3:
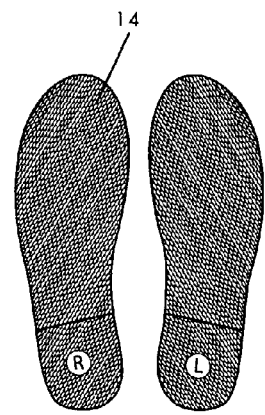
FIG. 3 is a bottom view of the boots constructed and for use in accordance with the teachings of the present invention.
Figure 4:
FIG. 4 is a perspective view of a pair of boots similar to those shown in FIG. 1, but being an ankle version of same.
Figure 5:
FIG. 5 is a perspective view of a pair of boots similar to those shown in FIG. 2, but being an ankle version of same.

The boot 11 includes some form of closure means such as a waterproof industrial, steel tooth zipper 16 that can be placed on the front as shown in FIGS. 1 and 3 or on the side as shown in FIGS. 2 and 4. In this way the boots can easily be slipped on and off. A lining (not shown) on the interior side of the zipper is also waterproof, thus making the boots 100% waterproof.

The boots 11A may have metallic reflective patches such as shown at 21-24 in FIGS. 15 through 19 on the boot exterior so the boot can easily be seen for safety purposes, like when waiting for a bus or walking on the street.

The boots 17 shown in FIG. 2 are similar to those in FIG. 1, except that the zipper 18 is located on the sides of the boots.

The boots 19, 20 shown in FIG. 4 and are similar to the boots 11, 17 shown in FIGS. 1 and 2, respectively, except that they are ankle versions of same.

A decorative film may be applied to the outside of a boot (See FIGS. 19 through 27) prior to vulcanization which allows for virtually any design to be placed on the boot.

Figure 6:
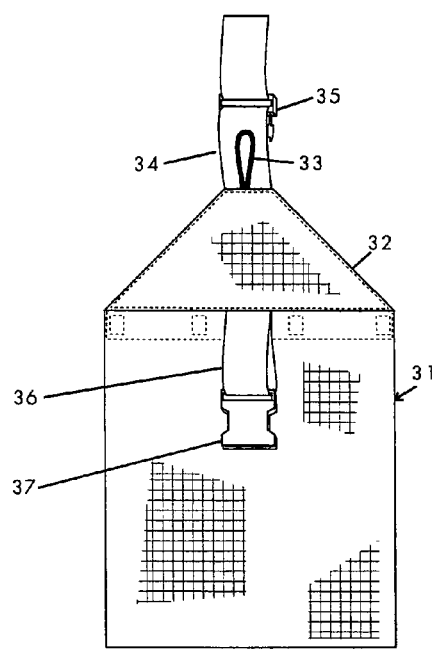
FIG. 6 is a rear elevational view of the outer container of the novel combination of the present invention.
Figure 7:
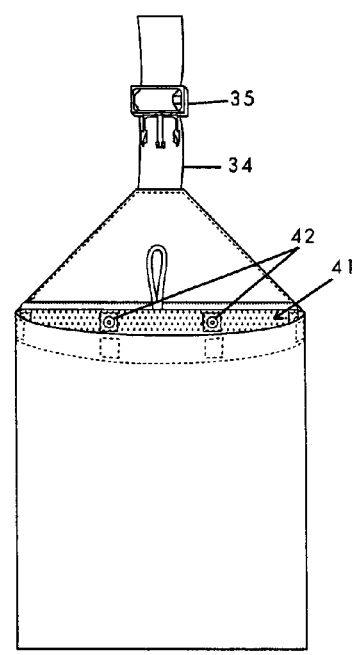
FIG. 7 is a front elevational view of the outer container of the novel combination of the present invention, with a washable bag being placed therein.
Figure 15:
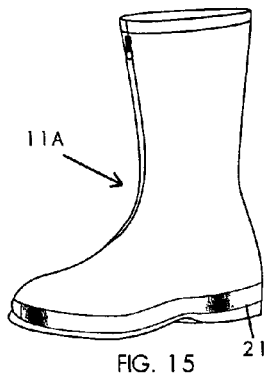
FIGS. 15 through 18 are perspective views of left and right boots showing them with reflective tape, and, FIGS. 19 through 27 are perspective views of boots showing various ornamentation applied to the exterior of the boots.
Figure 16:
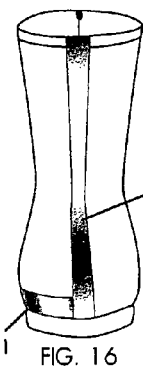
Figure 17:
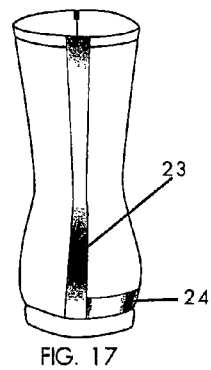
Figure 18:
Figure 19:
Figure 20:
Figure 21:
Figure 22:
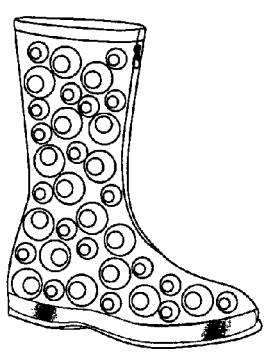
Figure 23:
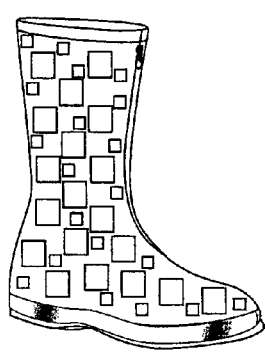
Figure 24:
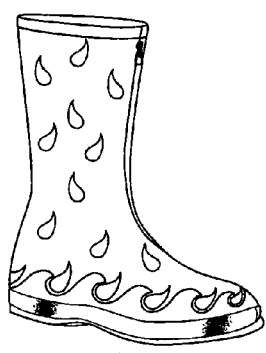
Figure 25:
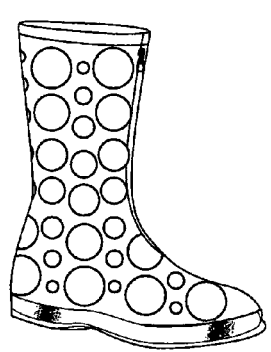
Figure 26:
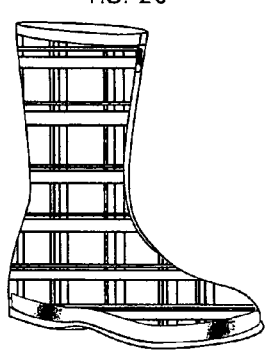
Figure 27:
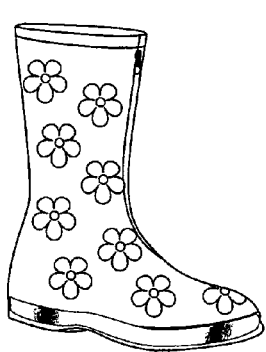

As shown in FIGS. 6 and 7, the novel combination of the present invention includes an outer, rectangular container 31 of rip stop nylon with an envelope-shaped closing flap 32 for receipt and containment of a washable laundry bag 41. The flap 32 has a loop 33 for hanging the container.

Centered on the end of the flap 32 is a strap 34 with a male plastic clip 35. Sewn to and depending from the rear side of the container 31 is a second strap 36 with a mating female clip 37.

The container further includes internal nylon snaps 38 (FIG. 13) for joining to the outer snaps 42 of the washable bag 41.

As shown in FIGS. 7 through 11 and 13-14, the combination invention includes a mesh, washable bag 41 of nylon, waterproof, odor-resistant material capable of being rolled up and having a rectangular body 43 and an upper opening zippered at 44 for receipt and holding of a pair of boots 11. The bag 41 further includes outer snaps 42, as of nylon, for mating with the container snaps 38 and a loop 45 for hanging the bag.

In use a child, for example, on a bad weather day, goes to school wearing the boots with the washable bag 41 snapped into the container 31, rolled up and carried in a backpack. At school, the container 41 is removed from the backpack, unrolled and the container 41 and wash bag 31 opened. The boots 11 are placed in the bag (FIGS. 8 and 9) and the bag 41 is zippered closed (FIG. 10).

Starting at the bottom of the container 31 (FIG. 10) the boots 11, bag 41 and container 31 are rolled up. Once reaching the top, the envelope flap 32 is brought over the container 21 (FIG. 11) and the clips 35, 37 are snapped into place (FIG. 12), securing the boots 11 inside, wrapped up tightly and held in a small space by the nylon clips 35, 37 and placed in the child's backpack. Alternatively, after the boots 11, have been placed in the bag 41 and the bag zippered closed (FIG. 13), the bag 41 can be hung up on a hook in the classroom by the loop 45. The bags 45 could be monogrammed for identification purposes.

In either case it eliminates the hazard of having hundreds of boots lining the hallways' of the school corridors, not to mention the propensity of losing boots in this manner. When school is over, the combination is removed from the backpack, or the boot-containing bag removed from its hook, the boots placed on the feet and the bag-containing container is place d back in the backpack.

Once home, the child removes the boots. The bag is removed from the container and the boots are placed in the bag, the bag is zippered and bag and boots are rinsed for cleaning, or placed in a washing machine for cleaning.

Thereafter, the bag with the boots therein can be hung up to dry using the loop. Since the boots are stretchable, you can normally get more than one year's use out of the boots. The boots may be made in but a few number of sizes such as small; medium and large, since by reason of their structure, each boot size will readily fit multiple shoe sizes. The combination is intended primarily for usage by students in day-care, pre-school and primary schools, but is readily suitable in whole sizes for both girls and boys. However, the combination has other applications as well such as camping, equestrian and farming. Both the container and bag are re-usable.

It should be obvious that changes, additions and omissions may be made in the details and arrangement of parts without departing from the spirit and scope of the invention as hereinafter claimed.

What is claimed is:

1. Wash bag and outer container combination for carrying boots, comprising;
   a rectangular-shaped mesh bag of rollable, waterproof, washable material, having
      an upper zippered opening for receipt and holding a pair of boots,
      a plurality of outer snaps, and,
      a loop for hanging the bag; and,
   an outer, rectangular-shaped container of rollable, waterproof, washable material, having
      an envelope-shaped closing flap for receipt and containment of the mesh bag,
      a strap depending from the flap with a clip thereon,
      a strap depending from the container with a mating clip,
      internal snaps for mating with the bag snaps to hold the bag in place within the container,
      a loop for hanging the container;
   the mesh bag and bag-containing container combination capable of being rolled up and stored in a small space, the container straps, when clips are mated and straps tightened, holding the combination in the small space.

2. Boots, wash bag and outer container combination comprising:
   a pair of boots, each boot adapted to be worn over footwear, having
      an upper arranged to be positioned over footwear, the upper having a top with an opening for receipt of the leg and footwear of a wearer and for covering the ankle and lower portion of the leg of a user,
      a sole integral with the upper and of a size and configuration substantially conforming to the bottom of footwear, the sole having a bottom of honeycomb design,
      each boot having a lined interior of thin nylon type material,
      the boots being of a rollable, stretchable, waterproof, washable material, and,
      a zippered opening for slipping the boots on and off;
   an inner, rectangular-shaped mesh bag of rollable, waterproof, washable material, having
      an upper zippered opening for receipt and holding a pair of boots,
      a plurality of outer snaps, and,
      a loop for hanging the bag; and,
   an outer, rectangular-shaped container of rollable, waterproof, washable material, having an envelope-shaped closing flap for receipt and containment of the boot-containing bag,
a strap depending from the flap with a clip thereon,
a strap depending from the container with a mating clip,
internal snaps for mating with the bag snaps to hold the bag in place within the container, and,
a loop for hanging the container;
the boots, the boot-containing bag and bag-containing container combination capable of being rolled up and stored in a small space, the container straps, when clips are mated and straps tightened, holding the combination in the small space.

* * * * *

UNITED STATES PATENT AND TRADEMARK OFFICE
CERTIFICATE OF CORRECTION

| | | |
|---|---|---|
| PATENT NO. | : 7,784,611 B2 | Page 1 of 1 |
| APPLICATION NO. | : 11/823052 | |
| DATED | : August 31, 2010 | |
| INVENTOR(S) | : Gordon | |

It is certified that error appears in the above-identified patent and that said Letters Patent is hereby corrected as shown below:

Title Page, under Item (65) insert:

-- (63) Related U.S. Application Data
Non-provisional of U.S. provisional application number 60/896,946, filed on March 26, 2007. --

Signed and Sealed this

Thirty-first Day of May, 2011

David J. Kappos
*Director of the United States Patent and Trademark Office*